Patented Aug. 8, 1944

2,355,114

UNITED STATES PATENT OFFICE 2,355,114

PROCESS FOR PRODUCING CONDENSATION PRODUCTS

Erik Schirm, Dessau, Germany, assignor, by mesne assignments, to The Hydronapthene Corporation, Wilmington, Del., a corporation of Delaware No Drawing. Application May 31, 1940, Serial No. 338,281. In Germany June 7, 1939

10 Claims. (Cl. 260—510)

This invention relates to condensation products of naphthalene polysulfonic acid halides and their production.

In accordance with this invention it has been found that valuable condensation products are obtained by condensing naphthalene polysulfonic acid halides containing at least three sulfonic acid halide groups with amino compounds, the hydrocarbon radicals of which contain at least one aromatic nucleus and at least one water-solubilizing group or at least one group convertible into a water-solubilizing group. In the latter instance, the convertible group is then converted into a water-solubilizing group. The hydrocarbon radicals of the amino compounds may also contain any known heteroatoms or heteroatomic groups and particularly sulfonamide groups as well as substituents.

Naphthalene polysulfonic acid chlorides such as naphthalene-1,3,5-trisulfochloride, naphthalene-1,3,6-trisulfochloride, naphthalene-1,3,7-trisulfochloride, naphthalene-1,3,5,7-tetrasulfochloride etc. constitute the preferred naphthalene sulfonic halides. The corresponding sulfobromides may likewise be used in an analogous manner, but, for practical reasons, the sulfochlorides are of principal interest.

The amino compounds, which according to the present invention are converted with the polysulfohalides are characterized by the fact that they contain one or more amino groups and hydrocarbon radicals which may be substituted and may contain heteroatoms and/or heteroatomic groups. These hydrocarbon radicals contain, moreover, at least one aromatic nucleus, and finally these amino compounds contain water-solubilizing groups or groups convertible into water-solubilizing groups.

As heteroatomic groups the hydrocarbon radicals may contain preferably sulfo-amide groups having a particular technical value and besides these groups other known heteroatoms and heteroatomic groups such as oxygen, sulfur or nitrogen, halogen, sulfone-, carbonamide-, ester groups and the like. Water-solubilizing groups include salt forming acid radicals of inorganic or organic polybasic acids, especially sulfonic acid groups, further quaternary ammonium groups, polyhydroxy-, polyether- and polyhydroxy-ether groups and other known groups which produce or enhance the water-solubility of organic compounds.

Groups which may be converted into water-solubilizing groups are e. g. hydroxyl-, amino-, mercapto- and disulfide-groups, halogen and other known groups which may be converted into water solubilizing groups.

Substituents which may be introduced into the hydrocarbon radicals of the amino compounds are, for example, hydrocarbon radicals, halogen atoms, hydroxyl, amino, mercapto, ether, ester, imino and amino groups and the like.

Amino compounds which may be used in this process as initial materials are e. g. metanilic acid, sulfanilic acid, aniline-3,5-disulfonic acid, 2-aminotoluene-4,6-disulfonic acid, the benzylamine sulfonic acids, 1-naphthylamine-4-, -5-, -6-, -7- or -8-sulfonic acid, di- and trisulfonic acids of the α- and β-naphthylamine, o- and p-aminobenzyl-sulfonic acid, o-, m- and p-aminobenzoic acid, 3- and 4-aminophthalic acid, 4-amino-salicylic acid, acid sulfuric acid esters of hydroxyl compounds such as β-(p-aminophenyl-)ethyl alcohol, β-(p-aminophenoxy-)ethyl alcohol, m-aminophenyl-β-hydroxethyl-sulfone as well as the phosphoric acid esters or C-sulfonic acids corresponding to these sulfuric acid esters, further polyglycol ethers of the aminophenols, the metanilic acid-diethanol-amide and similar compounds with several alcoholic hydroxyl groups or polyglycol ether radicals. Additional amino compounds include, m-aminobenzoyl-taurin, m-aminobenzoyl-glycine, metanilyl-taurin, metanilyl-glycine, m-aminobenzoyl-metanilic acid, metanilyl-sulfanilic acid, metanilyl-metanilyl-sulfanilic acid, metanilyl-metanilyl-glycine, metanilyl-anthranilic acid, metanilyl-aminophthalic acid and the like. Aromatic polyamino compounds with water-solubilizing groups e. g. diamino benzene- or, respectively, diamino-toluene-mono- and -disulfonic acids, benzidine-mono- and -disulfonic acids, naphthalenediamino-mono- and -disulfonic acids, as well as diamino carbonic acids such as 3,5-diamino-benzoic acid, 3,5-diamino-2-hydroxybenzoic acid, benzidine-3,3'-dicarbonic acid and the like likewise may be employed.

These amino compounds may be condensed either as such or mixed with one another or with any amino compounds containing no aromatic nucleus but merely water-soluble rendering groups such as taurin and the like; in order to enhance the water-solubility of the total compound.

In accordance with one manner of carrying out the present process the amino compounds may be introduced in steps by condensing first the naphthalene polysulfonic acid halides with initial materials for the amino compounds and subsequently building up the final products from the obtained condensation compounds. First the polysulfohalides may be condensed with amino compounds either with or without water-solubilizing groups containing groups convertible in amino groups. Then the amino group may be formed whereupon the intermediate products are acylated. In any case, the initial materials are selected in such a manner that the final products will contain water-solubilizing groups. In another embodiment amino compounds are condensed which do not contain water-solubilizing groups and the obtained condensation products are made water-soluble by a subsequent sulfuration or, if the compounds contain hydroxyl groups, by a subsequent adding of alkylene oxides.

If in employing polyamino compounds the latter are used in excess, the free amino groups still existing in the condensation product are advantageously acylated in a known manner. Any aromatic mono- and polysulfonic acid chlorides or carbonic acid anhydrides and -halides may be used advantageously.

According to the present invention the condensation is performed in general in an aqueous medium, at room or higher temperatures, in the presence of acid binding agents such as alkali or alkaline earth hydroxides, carbonates or acetates, pyridine and the like. Intermediate products that do not yet contain any water-solubilizing group, are advantageously made in the presence of an inert organic diluent, whereupon the final products are condensed in an aqueous medium.

The products obtainable according to the present process are valuable substances for tanning to be used either alone or in combination. They may also serve for the improvement of textiles e. g. for the preservation of wool, for dyeing with substantive dyestuffs and for producing color lakes by the precipitation of basic dyestuffs.

The condensation of disulfonic acid chlorides with aromatic amino compounds containing water-soluble making groups in the molecule is already known. Compared with these condensation products, the products produced according to the present process have a considerably higher molecular weight and therefore a better technical effect. Moreover products of at least the same effect may be obtained by using amino compounds of a considerably simpler constitution which are therefore more readily available.

Example 1

A paste produced by an intimate grinding of 145 parts by weight of naphthalene-1,3,6-trisulfochloride with 80 parts by weight of water is introduced, at room temperature, into a solution of 252 parts by weight of the sodium salt of the metanilyl-glycocol of the formula

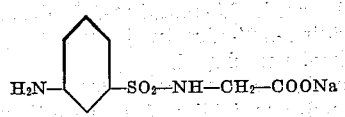

This latter compound may be produced by condensing m-nitrobenzene-sulfochloride with glycocol in the presence of acid binding agents and by reducing the condensation products with iron and diluted acetic acid, in 1200 parts by weight of water. The acid liberated while stirring the mixture is neutralized by a careful addition of concentrated soda lye. The soda lye is first added at room temperature but, when the reaction begins to slow up, the temperature is gradually raised to 90-95° C. To complete the conversion of the metanilyl glycocol into the condensation product, additional naphthalene trisulfochloride is added. When the conversion is completed, the reaction mixture is cooled down to 60° C. and the solution, which is neutral to slightly alkaline, is acidified with hydrochloric acid whereby a condensation product precipitates which is a resinous plastic while warm and solidifies upon cooling. The precipitate is filtered off at room-temperature and dried at 100° C. After pulverizing, a reddish-white powder is obtained which is very difficultly soluble in water but readily dissolves after an addition of alkalis or alkali-acetates. The yield is nearly quantitative when based upon the amount of metanilyl-glycocol used. The product represents a tanning material especially suitable for fine leathers.

Example 2

Seven hundred twenty-five parts by weight of metanilyl-metanilyl-sulfanilic acid of the formula

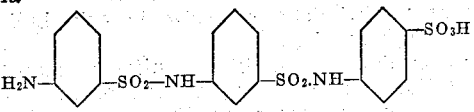

are suspended in 3000 parts by weight of water and dissolved by an addition of 60 parts by weight of sodium hydroxide. Now 212 parts by weight of naphthalene-1,3,5-trisulfochloride are dissolved in 800 parts by volume of acetone. This solution is stirred into the aforementioned solution at room-temperature. As soon as the mixture grows acid it is neutralized by means of soda lye or soda, and the condensation, as described in Example 1, is completed while warming the mixture up to 95° C., whereby the acetone applied as solvent is distilled off. Upon acidifying the solution with hydrochloric acid and cooling the solution down to 60° C. no precipitation of the condensation product will be formed. A precipitation will only occur after an addition of 1000 parts by volume of a saturated common salt lye. The copper coloured resin which is at handwarmth still plastic, is freed from the aqueous salt lye by kneading and dried at 100° C. Then it forms a reddish-grey powder easily soluble in water. The yield is quantitative.

Example 3

Two hundred two parts by weight of 2,4-diamino-toluene-6-sulfonic acid are dissolved in 2000 parts by weight of water with an addition of 50 parts by weight of sodium hydroxide. Into this solution, while stirring, 150 parts by weight of naphthalene-1,3,6-trisulfochloride are introduced which has been finely ground with water. Then the condensation is completed, while neutralizing, by a subsequent warming of the reaction mixture up to 90-95° C., but without a further addition of trisulfochloride. The solution of the obtained intermediate product of the formula

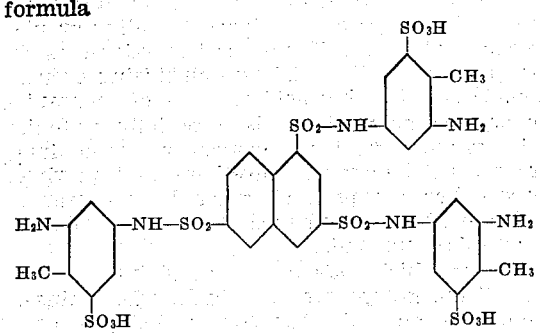

is neutral to slightly alkaline. Then this solution is cooled down to room-temperature, whereupon 190 parts by weight of p-toluene-sulfochloride, previously stirred with 120 parts by weight of water to form a fine paste, are introduced. This second condensation is effected under neutralizing and warming exactly as the first one. If there remain any evident free amino groups, they are converted into p-toluene-sulfamino groups by a further addition of p-toluene-sulfochloride and alkali. As described in Example 2 the condensation product is separated by an addition of hydrochloric acid and common salt, then filtered and dried.

Instead of p-toluene-sulfochloride in the present example other technically accessible sulfochlorides may likewise be employed such as 3,4-dichlorobenzene sulfochloride, tetrahydronaphthalene sulfochloride or benzene-m-disulfochloride. Further one may increase the amount of the naphthalene-1,3,6 - trisulfochloride up to double of the above indicated amount, in which case much less p-toluene-sulfochloride or no p-toluene-sulfochloride at all is required.

Example 4

Four hundred forty-six parts by weight of 1-naphthylamine-6-sulfonic acid are dissolved in 2000 parts by weight of water while adding 80 parts by weight of sodium hydroxide. Then I introduce into the solution, at room temperature, 270 parts by weight of naphthalene-1,3,5,7-tetra-sulfochloride which has previously been stirred with 160 parts by weight of water to form a fine paste. Thereafter I continue in the manner described in Example 1 but advantageously add, after acidifying the reaction mixture, 2000 parts by weight of a saturated common salt lye. The thus obtained condensation product possesses tanning properties.

Instead of the 1-naphthylamine-6-sulfonic acid the isomeric 1-naphthylamine-7-sulfonic acid or the technical mixture of these two acids may be used, as well as naphthionic acid, 1-naphthylamine-5-sulfonic acid, 2-naphthylamine-5-, -6-, -7- or -8-sulfonic acid or sulfanilic acid. In this manner very similar and technically very valuable products are obtained.

Example 5

Two hundred ninety-two parts by weight of m'-aminobenzoyl-metanilic acid of the formula

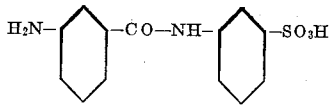

are dissolved in 2000 parts by weight of water while adding 40 parts by weight of sodium hydroxide. Into this solution 73 parts by weight of naphthalene-1,3,5-trisulfochloride, intimately stirred together with 45 parts by weight of water, are introduced at room-temperature. Then the reaction mixture is neutralized with soda lye until, after subsequent stirring at room-temperature for about one hour, the reaction mixture no longer develops acidic conditions. Then again 73 parts by weight of trisulfochloride stirred up with water are added, whereupon the condensation is completed as in Example 1. The working up of the condensation product is likewise effected as described in Example 1.

Instead of the aminobenzoyl metanilic acid one may likewise employ the metanilic-3- or -4-amino-phthalic acid or the technical mixture of both isomeres. The thus obtained materials, also in this case, have a high tanning effect.

Example 6

One hundred forty-one parts by weight of naphthalene-1,3,6-trisulfochloride, 300 parts by weight of m-nitraniline and 3000 parts by weight of toluene are heated in a steam bath or boiled under reflux, while stirring, until no further m-nitraniline-chlorohydrate separates from the reaction mixture. After cooling the mixture is extracted either directly or after driving off the toluene by water-vapor with an excess of 5% soda lye, whereupon the alkaline extracts are precipitated by means of hydrochloric acid. The flaky yellowish precipitate, the naphthalene-1,3,6-trisulfo-tri-m'-nitranilide of the formula

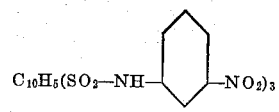

is filtered, washed with water and dried.

Two hundred forty-three parts by weight of this intermediate product are gradually stirred into a reflux mixture of 200 parts of weight of cast iron chips, 3000 parts by weight of a 50% ethylalcohol and 60 parts by weight of glacial acetic acid. When the reduction is completed the mixture is made alkaline in the warmth by means of soda and is filtered off from the iron. Now the alcohol is distilled off from the filtrate and the residue increased to its original volume by an addition of water and any amino compounds which separate are dissolved by an addition of soda lye. The proportion of amino compound in this solution is titrimetrically determined. Then, at room temperature, for each gram equivalent of amino compound (corresponding to ⅓ mol) 232 grams of finely pulverized benzoic acid-m-sulfochloride are added. Whereupon the developed acid is neutralized with soda lye or soda and the condensation is completed exactly as described in example 1. The precipitating and working up of the condensation product is done likewise as described in Example 1.

Example 7

Three hundred nine parts by weight of 4-nitro-3'-amino-diphenyl-amine-2-sulfonic acid are dissolved in 3000 parts by weight of water while adding 40 parts by weight of sodium hydroxide. An aqueous paste of 150 parts by weight of naphthalene-1,3,7-trisulfochloride are stirred into this solution at room-temperature, whereupon the condensation is completed by neutralizing and warming as described above. The hot solution, which towards the end is slightly alkaline, is then acidified by acetic acid until a slight litmus acid reaction is obtained. Thereafter the solution is stirred slowly into a boiling mixture of 200 parts by weight of castiron chips, 2000 parts by weight of water and 40 parts by weight of glacial acetic acid. After the reduction, the iron is precipitated with soda and the filtrate is separated from iron slime. The filtrate is concentrated if necessary to about 300 parts by volume and the proportion of amino compound in the solution is titrimetrically determined. After cooling down to room temperature at 20 to 25° C., for each gramme-equivalent of amino compound, 200 grams of p-toluene-sulfochloride, made into a paste with water (or the equivalent amount of another aromatic sulfochloride) is introduced. This second condensation is performed in exactly the same manner as the first one and the isolation of the final product by acidifying with hydrochloric acid while warm etc. is made as described in Example 1.

I claim:

1. A tanning agent having the formula Y(SO₂—NH—Ar)ₙ, wherein Y is a naphthalene radical, Ar is an aromatic group containing a non-basic water-solubilizing group and n is three to four.

2. A tanning agent having the formula Y(SO₂—NH—Ar)₃, wherein Y is a naphthalene radical, Ar is an aromatic group containing a non-basic water-solubilizing group and n is three.

3. A new compound having tanning characteristics and the formula Y(SO₂—NH—Ar—X—R)ₙ, wherein Y is a naphthalene radical, Ar is an aromatic radical, X is an SO₂NH radical, R is an organic radical selected from the group consisting of aryl radicals and low molecular aliphatic radicals, and n is three to four, the substituent groups on said naphthalene radical containing at least one water-solubilizing group.

4. A new compound having tanning characteristics and the formula Y(SO₂—NH—Ar—X—R)ₙ, wherein Y is a naphthalene radical, Ar is an aromatic radical, X is an SO₂NH radical, R is an aromatic group, and n is three to four, the substituent groups on said naphthalene radical containing at least one water-solubilizing group.

5. A new compound having tanning characteristics and the formula Y(SO₂—NH—Ar—X—R)ₙ, wherein Y is a naphthalene radical, Ar is an aromatic radical, X is an SO₂NH radical, R is an alkyl group, and n is three to four, the substituent groups on said naphthalene radical containing at least one water-solubilizing group.

6. A new compound having tanning characteristics and the formula Y(SO₂—NH—Ar—X—R)ₙ, wherein Y is a naphthalene radical, Ar is an aromatic radical, X is an SO₂NH radical, R is an organic radical selected from the group consisting of aryl radicals and low molecular aliphatic radicals, and n is three to four, the substituent groups on said naphthalene radical containing at least one acyl water-solubilizing group.

7. A new compound having tanning characteristics and the formula Y(SO₂—NH—Ar—X—R)ₙ, wherein Y is a naphthalene radical, Ar is an aromatic radical, X is an SO₂NH radical, R is an organic radical selected from the group consisting of aryl radicals and low molecular aliphatic radicals, and n is three to four, the substituent groups on said naphthalene radical containing at least one sulfonic acid group.

8. A new compound having tanning characteristics and the formula:

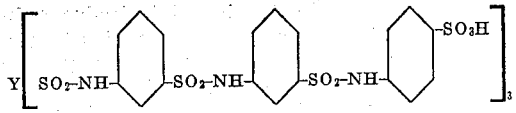

wherein Y is a naphthalene radical.

9. A new compound having tanning characteristics and the formula:

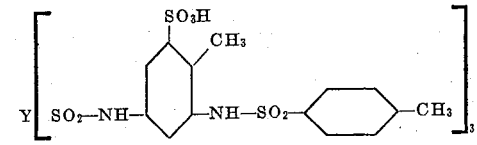

wherein Y is a naphthalene radical.

10. A new compound having tanning characteristics and the formula:

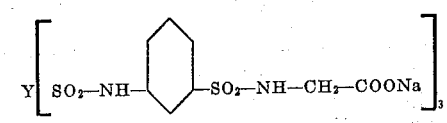

wherein Y is a naphthalene radical.

ERIK SCHIRM.